US009340922B2

(12) United States Patent
Im et al.

(10) Patent No.: US 9,340,922 B2
(45) Date of Patent: May 17, 2016

(54) METHOD OF FABRICATING SURFACE BODY HAVING SUPERHYDROPHOBICITY AND HYDROPHILICITY

(71) Applicant: Korea Advanced Institute of Science and Technology, Daejeon (KR)

(72) Inventors: Sung Gap Im, Daejeon (KR); Jae Bem You, Daejeon (KR); Youngmin Yoo, Seoul (KR); Myung Seok Oh, Incheon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 14/260,227

(22) Filed: Apr. 23, 2014

(65) Prior Publication Data

US 2014/0322455 A1 Oct. 30, 2014

(30) Foreign Application Priority Data

Apr. 25, 2013 (KR) ........................ 10-2013-0046316

(51) Int. Cl.
*C23C 16/44* (2006.01)
*C23C 16/50* (2006.01)
(Continued)

(52) U.S. Cl.
CPC ........... *D06M 23/16* (2013.01); *B01D 67/0088* (2013.01); *B01D 67/0093* (2013.01); *C08J 7/00* (2013.01); *D06B 1/02* (2013.01); *D06M 10/025* (2013.01); *D06M 10/10* (2013.01); *D06M 11/38* (2013.01); *D06M 15/277* (2013.01); *D06M 23/06* (2013.01); *B01D 2323/04* (2013.01); *B05D 1/60* (2013.01); *B05D 1/62* (2013.01); *B05D 5/04* (2013.01); *B05D 5/083* (2013.01); *D06M 2101/32* (2013.01); *D06M 2101/34* (2013.01); *D06M 2200/11* (2013.01); *D06M 2200/12* (2013.01)

(58) Field of Classification Search
CPC ........ C23C 16/44; C23C 16/50; C23C 16/545
See application file for complete search history.

(56) References Cited

U.S. PATENT DOCUMENTS 3,924,520 A * 12/1975 Boardman et al. ............ 430/302
5,641,383 A *  6/1997 Jun ................... H01L 21/31111
                                                    257/E21.251

(Continued)

FOREIGN PATENT DOCUMENTS

| JP | 63-256493 | * 10/1988 |
| KR | 10-2003-008782 A | 11/2003 |
| KR | 10-2003-0088782 A | 11/2003 |

OTHER PUBLICATIONS

Chen, Lei, et al., "Super-hydrophobic and/or Super-hydrophilic Surfaces Made by Plasma Process". Nanotech, vol. 3, 2009, pp. 194-197.*

(Continued)

*Primary Examiner* — Bret Chen
(74) *Attorney, Agent, or Firm* — Hultquist, PLLC; Steven J. Hultquist

(57) ABSTRACT

A method of preparing a material having a superhydrophobic region and a hydrophobic region is described, involving preparing a superhydrophobic surface body and hydrolyzing one surface of the prepared superhydrophobic surface body using a strong base. Such preparation method is simpler than conventional preparation methods and is capable of preparing a material having opposite surface characteristics at low costs.

10 Claims, 4 Drawing Sheets

(51) Int. Cl.

| | | |
|---|---|---|
| *D06M 23/16* | (2006.01) | |
| *C08J 7/00* | (2006.01) | |
| *D06M 10/02* | (2006.01) | |
| *D06M 10/10* | (2006.01) | |
| *D06M 11/38* | (2006.01) | |
| *D06B 1/02* | (2006.01) | |
| *D06M 15/277* | (2006.01) | |
| *D06M 23/06* | (2006.01) | |
| *B01D 67/00* | (2006.01) | |
| *B05D 1/00* | (2006.01) | |
| *D06M 101/32* | (2006.01) | |
| *D06M 101/34* | (2006.01) | |
| *B05D 5/04* | (2006.01) | |
| *B05D 5/08* | (2006.01) | |

(56) References Cited

U.S. PATENT DOCUMENTS

| | | | | |
|---|---|---|---|---|
| 6,621,191 | B1* | 9/2003 | Nomura | H02N 1/004 251/129.01 |
| 6,770,323 | B2* | 8/2004 | Genzer et al. | 427/248.1 |
| 2003/0093045 | A1* | 5/2003 | Erdman | A61F 13/15731 604/367 |
| 2003/0134100 | A1* | 7/2003 | Mao | A61L 27/34 428/304.4 |
| 2006/0029858 | A1* | 2/2006 | Ji | H01M 8/0234 429/450 |
| 2006/0228966 | A1* | 10/2006 | Gleason et al. | 442/123 |
| 2010/0210745 | A1* | 8/2010 | McDaniel et al. | 521/55 |
| 2010/0316861 | A1* | 12/2010 | Kubler et al. | 428/220 |
| 2011/0033663 | A1* | 2/2011 | Svec | C08F 220/18 428/141 |
| 2011/0105360 | A1* | 5/2011 | Derda | B01J 19/0046 506/10 |
| 2011/0165415 | A1* | 7/2011 | Ma et al. | 428/341 |
| 2012/0192952 | A1* | 8/2012 | Shen | B01F 13/0084 137/1 |
| 2013/0251948 | A1* | 9/2013 | Lyons et al. | 428/148 |
| 2014/0106127 | A1* | 4/2014 | Lyons et al. | 428/143 |
| 2014/0110120 | A1* | 4/2014 | Ogle et al. | 166/308.3 |

OTHER PUBLICATIONS

Dong, Jing, et al., "Control of Superhydrophilic and Superhydrophobic Graphene Interface". Scientific Reports, 3:1733, DOI: 10.1038, srep01733, Apr. 25, 2013, pp. 1-6.*

Chunder, Anindarupa, et al., "Conformal switchable superhydrophobic/hydrophilic surfaces for microscale flow control". Colloids and Surfaces A: Physicochemical and Engineering Aspects, 333 (2009) 187-193.*

Kim, Shin-Hyun, et al., "Janus Microspheres for a Highly Flexible and Impregnable Water-Repelling Interface". Angewandte Chemie, Int. Ed., 2010, 49, 2535-2538.*

Coclite, Anna Maria, et al., "Grafted Crystalline Poly-Perfluoroacrylate Structures for Superhydrophobic and Oleophobic Functional Coatings". Advanced Materials, 2012, 24, 4534-4539.*

Ma, Minglin, et al., "Superhydrophobic Fabrics Produced by Electrospinning and Chemical Vapor Deposition". Macromolecules 2005, 38, 9742-9748.*

Coclite, Anna Maria, et al., "Super-Hydrophobic and Oleophobic Crystalline Coatings by Initiated Chemical Vapor Deposition". Physics Procedia 46 (2013) 56-61.*

Besson, Eric, et al., "A Novel and Simplified Procedure for Pattterning Hydrophobic and Hydropholic SAMs for Microfluidic Devices by Using UV Photolithography". Langmuir 2006, 22, 8346-8352.*

Kim,S., et al., "Janus Microspheres For a Highly Flexible and Impregnable Water-Repelling Interface", "Angewandte Chemie International Edition", Mar. 15, 2010, pp. 2535-2538, vol. 49, No. 14.

* cited by examiner

METHOD OF FABRICATING SURFACE BODY HAVING SUPERHYDROPHOBICITY AND HYDROPHILICITY

CROSS-REFERENCE TO RELATED APPLICATION

This application claims priority under the provisions of 35 USC 119 to Korean Patent Application No. 10-2013-0046316 filed Apr. 25, 2013. The disclosure of Korean Patent Application No. 10-2013-0046316 is hereby incorporated herein by reference, in its entirety, for all purposes.

TECHNICAL FIELD

The present invention relates to a method of preparing a surface body having a superhydrophobic region and a hydrophobic region and an apparatus of preparing the same, and more particularly, to a method of preparing a surface body having a superhydrophobic region and a hydrophobic region by preparing a superhydrophobic surface body and hydrolyzing one surface of the prepared superhydrophobic surface body using a strong base, and an apparatus of preparing the same.

BACKGROUND ART

Recently, various functional materials have been developed. Such functional materials are prepared according to their intended use and used in certain environments. However, when materials are used in certain environments for a long period of time, the surface of many of the materials may be physically or chemically damaged, and thus may lose its original function. In the most general cases, the surface of materials may lose its characteristics due to atmospheric water or fine particles, organisms or the like. For this reason, these days, many researchers are attempting to protect materials from external environments. The most general attempt to solve the above-described problems is to impart superhydrophobicity to the surface.

Materials having superhydrophobic surface have low surface energy, and thus can effectively prevent other materials including water from aggregating on the surface and prevent the adhesion of organic matter, such as human fingerprints, and foreign matter such as dust, to the surface. Thus, materials having superhydrophobic surface can be widely applied to exterior materials for electronic products, in which contamination with organic matter is problematic, or to building materials that need to be protected from moisture or foreign matter. For these reasons, these days, many scientists are attempting to render superhydrophobicity to the surface of materials.

Conventional methods used to impart superhydrophobicity to the surface of materials, particularly stainless steel, typically include a method of coating the surface with titanium or a fluorine-based hydrophobic material such as Teflon. Among these methods, the method of forming titanium or titanium oxide on the surface has a problem in that the resulting surface has a water contact angle of less than 150°, suggesting that it has low hydrophobicity. Another problem is that a high-vacuum deposition process is used, which is performed at high temperatures and it can damage the material onto which coating is performed. Moreover, it increases the production cost. In addition, in the method of coating the surface with a fluorine-based hydrophobic material such as Teflon, the resulting surface has high hydrophobicity, but the vacuum deposition process is also used, which greatly increases the production cost when it is applied to a large-area surface. In an attempt to solve this problem, methods of coating the surface of materials with the fluorine-based hydrophobic material, and the like, have been studied, but there still remains a problem in that the fluorine-based hydrophobic material itself is expensive, which increases the production cost. Thus, there is an urgent need to develop technology of imparting superhydrophobicity to a large-area surface at low costs.

In addition to this, engineering the surface properties of a porous material to have both superhydrophobicity and hydrophilicity is of extreme difficulty. In case of porous materials, imparting superhydrophobicity on one surface will also convert the opposite surface owing to the porousity of the material.

Recently, various methods of preparing Janus microparticles having a hydrophilic surface and a hydrophobic surface have been developed. For instance, Janus particles have been fabricated using photopolymerizable droplets (Kim et al., *AngewandteChemie International Edition*. 49(14), 2535-2538, 2010). This method comprises treating photopolymerizable resin in an aqueous dispersion of a surfactant by a microfluidic device to prepare droplets having a uniform size and photopolymerizing the droplets to prepare spherical polymeric microparticles. Particularly, in this method, a hydrophilic surface and a hydrophobic surface can be formed on the two hemispheres of the microparticles by removing particles from the interface of the spherical microparticles and exposing the spherical microparticles to $SF_6$ plasma. These Janus microparticles can form a superhydrophobic barrier on the water surface at the water-air interface in the direction of the hemispheres depending on the surface characteristics of the Janus microparticles.

However, these methods focus on fabrication of Janus materials and not converting an arbitrary material to have Janus property. Also, this method has a shortcoming in that a process of orienting the two hemispheres in a desired direction is required in order to impart superhydrophobicity to such Janus microparticles having two surface characteristics.

Accordingly, the present inventors have made extensive efforts to solve the above-described problems, and as a result, have found that a material having a superhydrophobic region and a hydrophilic region can be prepared by preparing a superhydrophobic surface body using initiated chemical vapor deposition (iCVD) and hydrolyzing one surface of the superhydrophobic surface body using a strong base, thereby completing the present invention.

SUMMARY

It is an object of the present invention to provide a material having a superhydrophobic region and a hydrophilic region and a preparation method thereof.

It is another object of the present invention to provide a functional fiber having a superhydrophobic region and a hydrophilic region and an apparatus of preparing the same.

In order to accomplish the above object, the present invention provides a method of preparing a surface body having a superhydrophobic region and a hydrophilic region, the method comprising: (a) depositing a superhydrophobic polymer on a porous substrate to render the substrate superhydrophobic; and (b) hydrolyzing one surface of the superhydrophobic porous substrate, thereby modifying said surface of the superhydrophobic porous substrate into a hydrophilic surface.

The present invention provides a method of preparing a functional fiber having a superhydrophobic region and a hydrophilic region, comprising: (a) depositing a superhydrophobic polymer on a rolling film by using a superhydrophobic monomer and an initiator, while unwinding a fabric from a rolling film which the fabric is wound; and (b) hydrolyzing one surface of superhydrophobic fabric in a reactor containing basic solution, thereby modifying said surface of superhydrophobic fabric into a hydrophilic surface.

The present invention also provides an apparatus of preparing a functional fiber having a superhydrophobic region and a hydrophilic region, comprising: (a) a reactor for spraying a superhydrophobic monomer and an initiator onto a rolling film, while unwinding a fabric from a rolling film which the fabric is wound; (b) a hydrolysis bath for treating one surface of the rolling film passed by the reactor; (c) a dryer for drying the rolling film passed by the hydrolysis bath; and (d) a wound roll for winding the rolling film passed by the dryer.

In addition, the present invention provides an apparatus of preparing a functional fiber having a superhydrophobic region and a hydrophilic region, comprising: (a) a reactor spraying a superhydrophobic monomer and an initiator onto a rolling film, while unwinding a fabric from a rolling film which the fabric is wound, thereby producing a superhydrophobic surface; (b) a coater for forming a superhydrophobic protecting layer on the superhydrophobic porous substrate; (c) a plasma apparatus for rendering other surface of the porous substrate hydrophilic by plasma; and (d) a remover of protecting layer for removing the protecting layer, thereby rendering the one surface of the porous substrate superhydrophobic.

In addition, the present invention provides a method of preparing a surface body having a superhydrophobic region and a hydrophilic region, comprising: (a) depositing a superhydrophobic polymer on a porous substrate to render the substrate superhydrophobic; (b) forming a superhydrophobic protecting layer on one surface of the superhydrophobic porous substrate; (c) treating other surface of the porous substrate with plasma, thereby rendering other surface of the porous substrate hydrophilic; and (d) removing a superhydrophobic protecting layer, thereby rendering the one surface of the porous substrate superhydrophobic.

DETAILED DESCRIPTION

Figure 1:
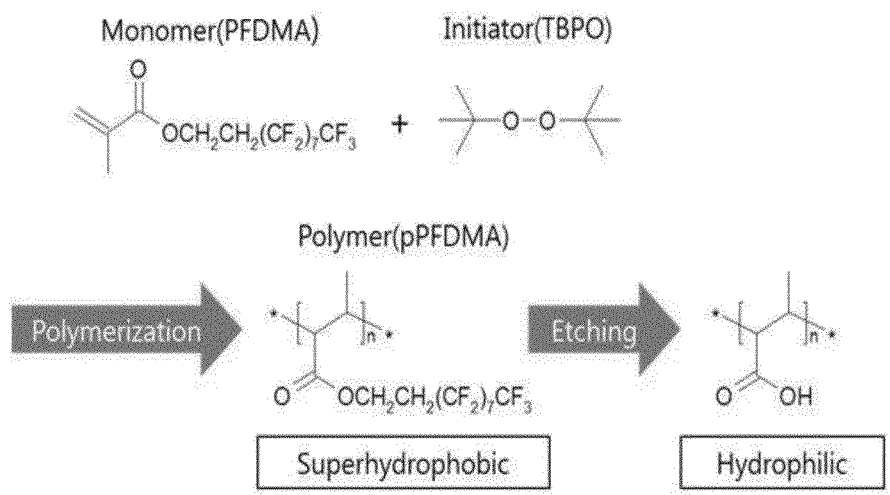
FIG. 1 shows a mechanism for preparing a surface body according to the present invention.

Unless defined otherwise, all technical and scientific terms used herein have the same meaning as commonly understood by one of ordinary skill in the art to which the invention pertains. Generally, the nomenclature used herein and the experiment methods are those well known and commonly employed in the art.

The present inventors have found that a Janus material (fabric) having both a superhydrophobic region and a hydrophobic region can be prepared by depositing a superhydrophobic polymer on a substrate to prepare a superhydrophobic surface body and hydrolyzing one surface of the prepared superhydrophobic surface body to convert the one surface into a hydrophobic surface.

In one aspect, the present invention is directed to a method of preparing a surface body having a superhydrophobic region and a hydrophilic region, the method comprising: (a) depositing a superhydrophobic polymer on a porous substrate to render the substrate superhydrophobic; and (b) hydrolyzing one surface of the superhydrophobic porous substrate, thereby modifying said surface of the superhydrophobic porous substrate into a hydrophilic surface.

As used herein, the term "superhydrophobic surface body" refers to a material whose surface has a water contact angle of more than 150°.

Examples of a substrate that may be used in the present invention include, but not limited to, glass, a metal, metal oxide, wood, paper, fiber, plastic, rubber, leather, silicon wafer and the like.

Examples of the plastic may include, but are not limited to, polyethylene (PE), polypropylene (PP), polystyrene (PS), polyethylene terephthalate (PET), polyamides (PA), polyester (PES), polyvinyl chloride (PVC), polyurethanes (PU), polycarbonate (PC), polyvinylidene chloride (PVDC), polytetrafluoroethylene (PTFE), polyetheretherketone (PEEK), and polyetherimide (PEI).

The superhydrophobic monomer that is used in the present invention is preferably a compound containing a vinyl group and fluorine. Examples of the compound may include, but are not limited to, 1H,1H,2H,2H-perfluorodecylacrylate (PFDA), perfluorodecyl methacrylate (PFDMA), dodecafluoroheptyl acrylate, pentafluorophenyl methacrylate, 3,3,4,4,5,5,6,6,7,7,8,8,9,9,9-pentadecafluorononyl ester, 2-methyl-3,3,4,4,5,5,6,6,7,7,8,8,9,9,9-pentadecafluorononyl ester, 3,3,4,4,5,5,6,6,7,7,8,8-tridecafluorooctyl ester, 2-methyl-3,3,4,4,5,5,6,6,7,7,8,8-tridecafluorooctyl ester, 3,3,4,4,5,5,6,6,7,7,7-undecafluoroheptyl ester, 2-methyl-3,3,4,4,5,5,6,6,7,7,7-undecafluoroheptyl ester, 3,3,4,4,5,5,6,6,6-nonafluorohexyl ester, 2-methyl-3,3,4,4,5,5,6,6,6-nonafluorohexyl ester, 3,3,4,4,5,5,6,6,7,7,8,8,9,9,10,10,11,11-nonadecafluoroundecyl ester, 2-methyl-3,3,4,4,5,5,6,6,7,7,8,8,9,9,10,10,11,11-nonadecafluoroundecyl ester, 3,3,4,4,5,5,6,6,7,7,8,8,9,9,10,10,11,11,12,12,12-heneicosafluorododecyl ester, 2-methyl-3,3,4,4,5,5,6,6,7,7,8,8,9,9,10,10,11,11,12,12,12-heneicosafluorododecyl ester, 3,3,4,4,5,5,6,6,7,7,8,8,9,9,10,10,11,11,12,12,13,13,13-tricosafluorotridecyl ester, 2-methyl-3,3,4,4,5,5,6,6,7,7,8,8,9,9,10,10,11,11,12,12,13,13,13-tricosafluorotridecyl ester, 3,3,4,4,5,5,6,6,7,7,8,8,9,9,10,10,11,11,12,12,13,13,14,14,14-pentacosafluorotetradecyl ester, and 2-methyl-3,3,4,4,5,5,6,6,7,7,8,8,9,9,10,10,11,11,12,12,13,13,14,14,14-pentacosafluorotetradecyl ester.

The process of depositing the superhydrophobic monomer may be performed using chemical vapor deposition (CVD), plasma-enhanced chemical vapor deposition (PECVD), or initiated chemical vapor deposition (iCVD). Preferably, initiated chemical vapor deposition (iCVD) may be used.

The initiated chemical vapor deposition (iCVD) process that is used in the present invention is a process in which the polymerization of the monomer is initiated by decomposing a gaseous initiator into radicals. As the initiator, a peroxide such as tert-butyl peroxide (TBPO) is mainly used, which is a volatile compound having a boiling point of about 110° C. and is thermally decomposed at a temperature of about 150° C. In addition to materials such as tert-butyl peroxide (TBPO), which are thermally decomposed to form radicals, benzophenone that is decomposed by light such as UV light to form radicals may also be used as the initiator.

The iCVD process does not significantly differ from a conventional CVD process for depositing inorganic thin layers, because the deposition of the thin layer occurs as a result of the supply of energy such as heat from a filament heat source or UV light. However, the iCVD process is performed at a low filament temperature between 150° C. and 220° C., and in this process, the temperature of the substrate surface on which the thin polymer layer is deposited can be maintained at a low temperature of 25-40° C. Due to this low surface temperature, the iCVD process can be effectively used to form a thin polymer layer on various substrates such as paper or cloth, which is weak against mechanical or chemical impact. In addition, the iCVD process is performed in a vacuum between 40 mTorr and 900 mTorr, and thus does not require a high-vacuum system, and the amounts of the monomer and the initiator are controlled at their inlet valves.

A step (a) of depositing the monomer may be performed for 5-60 minutes, and preferably 10 minutes, while maintaining the temperature of the substrate at 25-60° C., and preferably 35-40° C., and maintaining the pressure of the chamber in the reactor at 40-900 mTorr. The step may depend on deposition temperature, pressure, and the amount of an initiator and monomer.

If the temperature of the substrate is lower than 25° C., the substrate may obtain uneven surface by not carrying out an uniform vapor deposition, and if the temperature of the substrate is higher than 60° C., the deposition rate will be slow. If the pressure of the chamber of the reactor is lower than 40 mTorr, he deposition rate will be slow, and if the pressure is higher than 900 mTorr, the substrate may obtain uneven surface. In addition, the deposition time is related to the deposition thickness, and the deposition thickness will be thinner or thicker according to the deposition time.

In order to convert one surface of the superhydrophobic surface body into a hydrophilic surface, the one surface is hydrolyzed using a hydrolyzing agent. The hydrolyzing agent that is used in the present invention may be an aqueous solution of a strong base such as KOH or tetramethylammonium hydroxide (TMAH). The concentration of the strong base in the aqueous solution may be 0.1M to 5M. If the concentration of the strong base in the solution is lower than 0.1M, the hydrolysis time will be increased due to low reaction rate, and if the concentration of the strong base in the solution is higher than 5M, the reaction rate will be increased due to the increase in the concentration, but the strong base solution will have strong reactivity, and thus both surfaces of the surface body can be etched or the surface body itself can be damaged. For these reasons, in an embodiment of the present invention, an aqueous solution of 3M KOH is used, which can etch only one surface of the surface body without damaging the surface body.

As a result of the hydrolysis process, the ester group (—COO—) of the deposited polymer layer is converted into acetic acid (—COOH) while fluorine groups rendering the surface hydrophobic are removed.

The hydrophilic surface formed by hydrolyzing with the strong base has a water contact angle of less than 30°.

In addition, in order to increase the durability (i.e., mechanical strength and chemical resistance) of the superhydrophobic surface body, the method of the present invention may further comprise, before step (a), a step of depositing a crosslinking agent on both surfaces of the substrate.

In the present invention, the crosslinking agent may comprise at least two vinyl groups per molecule. Examples of the compound may include, but are not limited to, 2,4,6,8-tetramethyl-2,4,6,8-tetravinylcyclotetrasiloxane (V4D4), 1,3,5-trimethyl-1,3,5-trivinyl-cyclotrisiloxane (V3D3), divinylbenzene (DVB), diethyleneglycolDivinylether (DEGDVE), diethyleneglycolDiacrylate (DEGDA), ethyleneglycoldimethacrylate (EGDMA), and 1,3-diethenyl-1,1,3,3-tetramethyl-Disiloxane (V2D2).

As used herein, the term "chemical resistance" refers to resistance to chemical impact. A material that is dissolved by an acid or reacts with a specific kind of gas is a material having a low chemical resistance.

In the case of the material prepared according to the present invention, it can be seen that the superhydrophobic region shows a water contact angle of 150° C., whereas the hydrophilic region shows a water contact angle of 0° C. due to the complete absorption of water therein.

Figure 5:
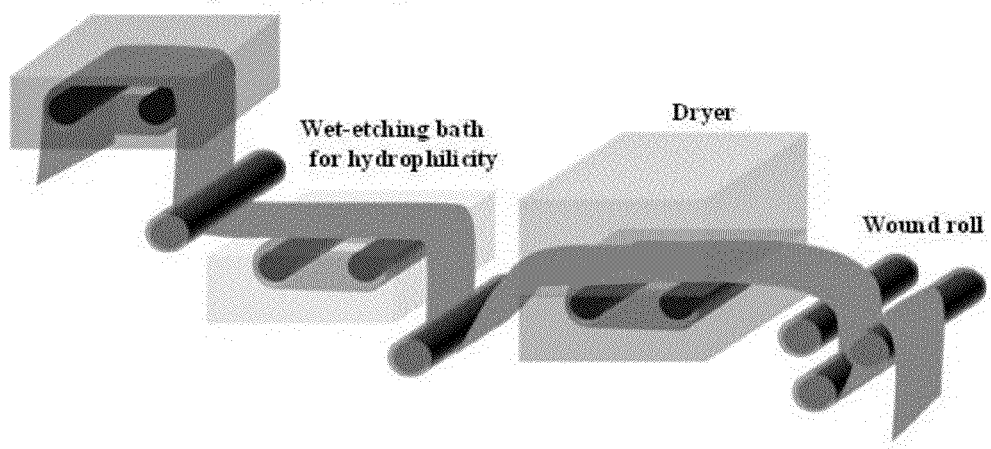
FIG. 5 is a flow diagram showing process of preparing a functional fiber having a superhydrophobic region and a hydrophilic region according to an embodiment of the present invention.

Also, as shown in FIG. 5, a surface body having a superhydrophobic region and a hydrophilic region may be prepared by using roll-to-roll in which the hydrophilicity is obtained by hydrolysis. Roll-to-roll process is performed at the same time while rotating a wound film and functional film (fiber) is prepared easily by applying the roll-to-roll process.

There are various functional films such as Spandex™ or Gore-Tex™. The Spandex™ is a representative example of thermoplastic polyurethane (TPU), which is prepared by dissolving polymerized polyurethane resin chip, coating it on a release paper in a certain thickness by melt-blown or knife coating, etc. followed by drying and separating the release paper and thin film layer, thereby obtaining a hydrophilic non porous film. The Gore-Tex™ is a representative example of a polytetrafluoroethylene hydrophobic porous film and the Sympatex is a representative example of polyethylene terephthalate film. These functional films have permeability and barrier property, which emit sweat generated in the inside to outside while shutting off water or oil from the outside (as hydrostatic pressure). The hydrophobic porous film has numerous fine porosities and therefore water of microns cannot pass, while sweat can pass. The hydrophilic non porous film has hydrophilicity instead of non porosity and absorbs sweat to emit it to the outside.

Firstly, depositing a superhydrophobic polymer on both sides of a substrate is performed to prepare a surface body having a superhydrophobic region and a hydrophilic region. Roll to roll process using roll having mesh or dot phase may be used for the deposition.

Another aspect of the present invention provides a method of preparing a functional fiber having a superhydrophobic region and a hydrophilic region, the method comprising: (a) depositing a superhydrophobic polymer on a fiber to render both sides of the fiber superhydrophobic; and (b) hydrolyzing one surface of the superhydrophobic fiber, thereby modifying said surface of the superhydrophobic fiber into a hydrophilic surface.

Also, another aspect of the present invention provides a method of preparing a functional fiber having a superhydrophobic region and a hydrophilic region, comprising: (a)

depositing a superhydrophobic polymer on a rolling film by using a superhydrophobic monomer and an initiator, while unwinding a fabric from a rolling film which the fabric is wound; and (b) hydrolyzing one surface of superhydrophobic fabric in a reactor containing basic solution, thereby modifying the surface of superhydrophobic fabric into a hydrophilic surface.

Also, the present invention provides an apparatus of preparing a functional fiber having a superhydrophobic surface region and a hydrophilic surface region, comprising: (a) a reactor for spraying a superhydrophobic monomer and an initiator onto a rolling film, while unwinding a fabric from a rolling film which the fabric is wound; (b) a hydrolysis bath for treating one surface of the rolling film passed by the reactor; (c) a dryer for drying the rolling film passed by the hydrolysis bath; and (d) a wound roll for winding the rolling film passed by the dryer.

Especially, the reactor has a roll therein. A superhydrophobic monomer and an initiator are added through a gas line which is installed in the reactor to deposit superhydrophobic polymer on the unwound fabric roll, while a rolling film is unwind.

The amount of the superhydrophobic monomer and the initiator to be deposited on the fabric depends on the surface condition of the fabric and hydrophobicity degree. Also, it depends on mesh roll or dot roll.

Considering that superhydrophobic monomers, not polymers, can be deposited on the fabric, the process of depositing a superhydrophobic monomer and an initiator, thereby depositing a superhydrophobic polymer, can be carried out sequentially. Pre-drying is performed in a pre-dryer at temperature of 30 to 70° C. The passage rate of the dryer of 10-30 m/min is preferred.

In order to convert one surface of the superhydrophobic surface body into a hydrophilic surface, the one surface of rolling film passed by the pre-dryer is treated with basic solution in a hydrolysis bath. Hydrolysis is carried out to change one surface of the superhydrophobic surface body into a hydrophilic surface. The hydrolyzing agent that is used in the present invention may be an aqueous solution of a strong base such as KOH or tetramethylammonium hydroxide (TMAH). The concentration of the strong base in the aqueous solution may be 0.1M to 5M. If the concentration of the strong base in the solution is lower than 0.1M, the hydrolysis time will be increased due to low reaction rate, and if the concentration of the strong base in the solution is higher than 5M, the reaction rate will be increased due to the increase in the concentration, but the strong base solution will have strong reactivity, and thus both surfaces of the surface body can be etched or the surface body itself can be damaged. For these reasons, in an embodiment of the present invention, an aqueous solution of 3M KOH is used, which can etch only one surface of the surface body without damaging the surface body.

And then the rolling film passed by the hydrolysis bath is applied continuously into a dryer. The dryer is preferred to have a temperature at 50 to 90° C. and passage rate of 10-30 m/min.

Finally, the rolling film passed by the dryer is wound in a wounding roll. 2-layer or 3-layer fabrics can be prepared by repeating the above processes.

In addition, another aspect of the present invention provides the present invention provides a method of preparing a surface body having a superhydrophobic region and a hydrophilic region, comprising: (a) depositing a superhydrophobic polymer on a porous substrate to render the substrate superhydrophobic; (b) forming a superhydrophobic protecting layer such as heat- or UV-thermosetting resin on one surface of the superhydrophobic porous substrate; (c) treating other surface of the porous substrate coated with a superhydrophobic protecting layer such as heat- or UV-thermosetting resin, with plasma, thereby rendering other surface of the porous substrate hydrophilic; and (d) removing a superhydrophobic protecting layer, thereby rendering the one surface of the porous substrate superhydrophobic.

The resin may be an epoxy resin, a polyurethane resin, an acrylic resin or a polyester resin. The superhydrophobic protecting layer may be very thin polyester (PE) film or polyethyleneterephthalate (PET), polycarbonate (PC). The film thickness less than 100, all is appropriate.

Figure 6:
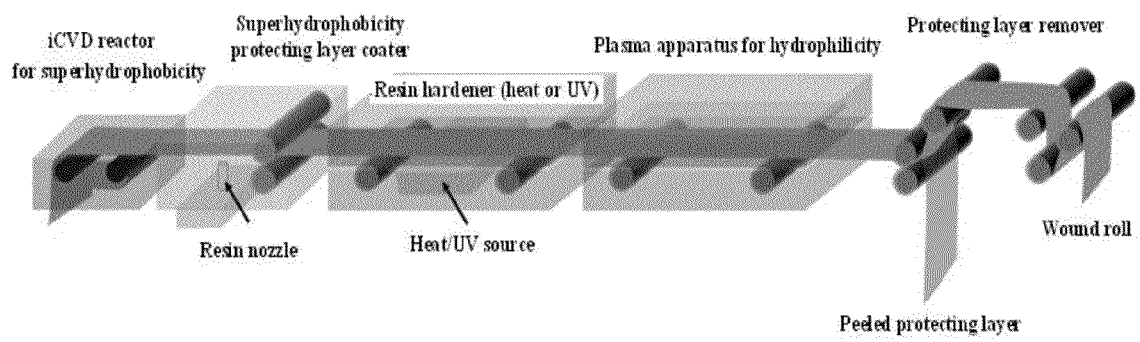
FIG. 6 is a flow diagram showing process of preparing a functional fiber having a superhydrophobic region and a hydrophilic region according to another embodiment of the present invention.

FIG. 6 is a diagram showing a roll-to-roll apparatus for giving hydrophilicity using plasma.

Figure 7:
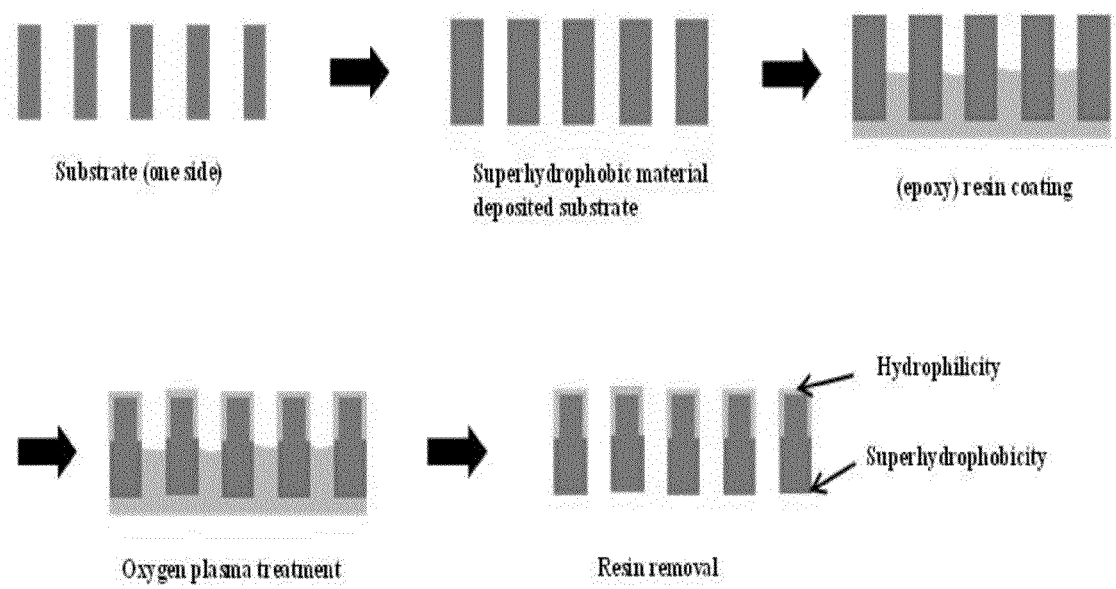
FIG. 7 is a flow diagram showing process of preparing a functional fiber having a superhydrophobic region and a hydrophilic region according to another embodiment of the present invention.

As shown in FIG. 7, after depositing a superhydrophobic material on a porous substrate, one side of the substrate is coated with resin and oxygen plasma is treated on uncoated side thereof, thereby rendering the surface treated with the oxygen plasma hydrophilic and the untreated surface hydrophobic. Because of coat of resin, the surface of having no plasma influence maintains hydrophobicity. The protecting layer can be removed using peeling off the substrate and the resin by a remover.

In addition, the apparatus of the invention may further comprises a coater for forming a superhydrophobic protecting layer on the superhydrophobic porous substrate; a plasma apparatus for rendering other surface of the porous substrate hydrophilic by plasma; and a remover of protecting layer for removing the protecting layer, thereby rendering the one surface of the porous substrate superhydrophobic.

A preferable embodiment of the present invention provides an apparatus of preparing a functional fiber having a superhydrophobic surface region and a hydrophilic surface region, comprising: (a) a reactor spraying a superhydrophobic monomer and an initiator onto a rolling film, while unwinding a fabric from a rolling film which the fabric is wound, thereby producing a superhydrophobic surface; (b) a coater for forming a superhydrophobic protecting layer on the superhydrophobic porous substrate; (c) a plasma apparatus for rendering other surface of the porous substrate hydrophilic by plasma; and (d) a remover of protecting layer for removing the protecting layer, thereby rendering the one surface of the porous substrate superhydrophobic.

Also, the method of the present invention further comprises forming a superhydrophobic protecting layer on one surface of the superhydrophobic porous substrate; treating other surface of the porous substrate with plasma, thereby rendering other surface of the porous substrate hydrophilic; and removing a superhydrophobic protecting layer, thereby rendering the one surface of the porous substrate superhydrophobic.

A preferable embodiment of the present invention provides a method of preparing a surface body having a superhydrophobic surface region and a hydrophilic surface region, comprising: (a) depositing a superhydrophobic polymer on a porous substrate to render the substrate superhydrophobic; (b) forming a superhydrophobic protecting layer on one surface of the superhydrophobic porous substrate; (c) treating other surface of the porous substrate with plasma, thereby rendering other surface of the porous substrate hydrophilic; and (d) removing a superhydrophobic protecting layer, thereby rendering the one surface of the porous substrate superhydrophobic.

EXAMPLES

Hereinafter, the present invention will be described in further detail with reference to examples. It will be obvious to a person having ordinary skill in the art that these examples are illustrative purposes only and are not to be construed to limit the scope of the present invention.

Example 1

Preparation of Material Having Superhydrophobic Region and Hydrophilic Region As shown in FIG. 1, the monomer PFDMA (3,3,4,4,5,5,6,6,7,7,8,8,9,9,10,10,10-heptadecafluorodecyl methacrylate, Aldrich) was placed in a monomer chamber in an iCVD reactor (Daeki Hi-Tech Co., Ltd.) and heated to 80° C. TBPO (tert-butyl peroxide, Aldrich) as an initiator was placed in an initiator chamber and maintained at room temperature.

First, deposition was performed using each of a polyester mesh fabric (Puritech PRT-S1091) and a nylon mesh fabric (WW-2030) as a substrate.

For deposition of PFDMA, PFDMA and TBPO at a ratio of 1:1 were introduced into the iCVD reactor while the temperature of filaments in the reactor was maintained at 200-220° C., the temperature of the substrate in the reactor was maintained at 35-40° C., and preferably 40° C., and the pressure of the chamber in the reactor was maintained at 40-100 mbar. Under such conditions, the deposition of PFDMA was performed for 10 minutes, thereby obtaining a polyester mesh fabric and a nylon mesh, each of which has a 70-nm-thick pPFDMA (poly-PFDMA) layer deposited thereon. In the same manner as described above, pPFDMA was also deposited on the lower surface of each of the polyester mesh fabric and the nylon mesh fabric, thereby preparing superhydrophobic surface body.

One surface of each of the superhydrophobic surface bodies was wet-etched with KOH (3M) solution at 50° C. for about 3 hours to convert the one surface into a hydrophilic surface.

Experimental Example 1

Examination of Durability by XPS Analysis

Figure 2:
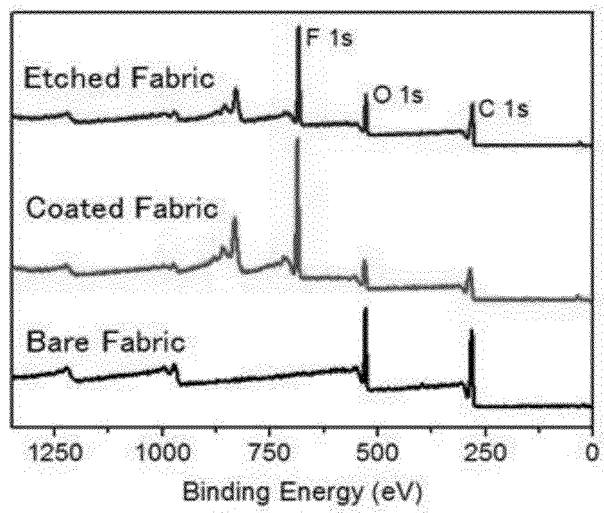
FIG. 2 shows the results of X-ray Photoelectron Spectroscopy (XPS) analysis of the surface body before and after hydrolysis.

The material having the superhydrophobic region and the hydrophilic region, prepared using the polyester mesh fabric as the substrate in Example 1, was analyzed by XPS (X-ray photoelectron spectroscopy) (Multilab 2000, Thermo) before and after hydrolysis to examine the ratio of elements present on the surface. The results of the analysis are shown in FIG. 2.

As a result, it could be seen that the surface of the material prepared in Example 1 was free of a fluoro group after hydrolysis.

Experimental Example 2

Analysis of Functional Group by FT-IR

The material having the superhydrophobic region and the hydrophilic region, prepared using the polyester mesh fabric as the substrate in Example 1, was analyzed by FTIR spectrometry (ALPHA FTIR Spectrometer, BRUKER). The results of the analysis are shown in FIG. 3.

Figure 3:
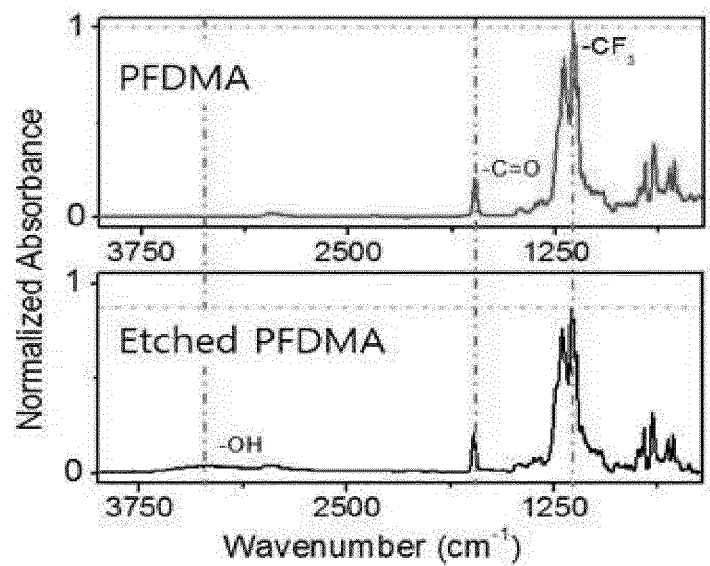
FIG. 3 shows the results of Fourier Transform Infrared Spectroscopy (FTIR) analysis of the surface body before and after hydrolysis.

As can be seen in FIG. 3, in the case of the etched PFDMA, —$CF_3$ at a position of 1250 $cm^{-1}$ decreased, and —OH appeared between 3200 $cm^{-1}$ and 3400 $cm^{-1}$ while carboxylic acid was formed due to separation of the fluoro chain from the ester group.

Experimental Example 3

Measurement of Water Contact Angle of Janus Fabric

Figure 4:
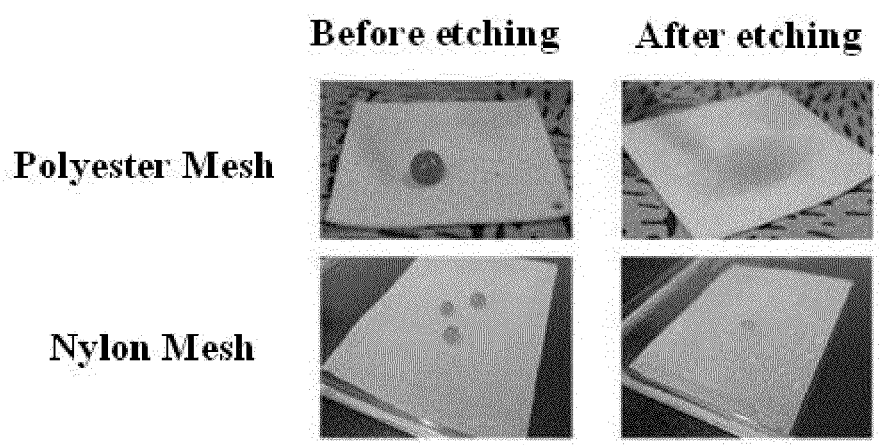
FIG. 4 is a set of photographs showing the measurement of water contact angle on different substrates before and after hydrolysis.

Each of the materials having the superhydrophobic region and the hydrophilic region, prepared in Example 1, was immersed in water and ultrasonically treated for 24 hours, after which one drop (10 µl) of distilled water was dropped onto each of the materials. Then, the materials were photographed in order to analyze the water contact angle of the surface. The photographs are shown in FIG. 4.

In the case of the material prepared using the polyester mesh fabric in Example 1, it could be seen that one surface of the material was converted into a hydrophilic surface as a result of the hydrolysis process. In addition, in the case of the material prepared using the nylon mesh fabric, it could be seen that the water contact angle of the surface of the material did differ between before and after the hydrolysis process.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

INDUSTRIAL APPLICABILITY

The method of preparing a material having a superhydrophobic region and a hydrophilic region according to the present invention is simpler than conventional preparation methods, can prepare the material at low costs, and makes it possible control the thickness of the polymer layer on the material in the nanometer scale.

In addition, the material having a superhydrophobic region and a hydrophilic region according to the present invention can be used in filtration and separation processes. Additionally, according to the present invention, materials having various opposite surface characteristics in addition to hydrophobic and hydrophilic surface characteristics can be prepared.

The functional fiber such as Spandex™ or Gore-Tex™ can be prepared by using roll-to-roll process according to the present invention.

The invention claimed is:

1. A method of preparing a surface body having a superhydrophobic region and a hydrophilic region, the method comprising:
    (a) depositing a superhydrophobic polymer on a porous substrate to render the substrate superhydrophobic using initiated chemical vapor deposition; and
    (b) hydrolyzing by wet-etching one surface of the superhydrophobic porous substrate, thereby modifying said surface of the superhydrophobic porous substrate into a hydrophilic surface by converting ester group of the superhydrophobic polymer into carboxyl group and removing fluorine group.

2. The method of claim 1, wherein the substrate is selected from the group consisting of glass, metal, metal oxide, wood, paper, fiber, plastic, rubber, leather, and silicon wafer.

3. The method of claim 2, wherein the plastic is selected from the group consisting of polyethylene (PE), polypropylene (PP), polystyrene (PS), polyethylene terephthalate (PET), polyamides (PA), polyester (PES), polyvinyl chloride (PVC), polyurethanes (PU), polycarbonate (PC), polyvinylidene chloride (PVDC), polytetrafluoroethylene (PTFE), polyetheretherketone (PEEK), and polyetherimide (PEI).

4. The method of claim 1, wherein a monomer of the superhydrophobic polymer is a compound comprising a vinyl group and fluorine.

5. The method of claim 4, wherein the compound comprising a vinyl group and fluorine is selected from the group consisting of 1H,1H,2H,2H-perfluorodecylacrylate (PFDA), perfluorodecyl methacrylate (PFDMA), dodecafluoroheptyl acrylate, pentafluorophenyl methacrylate, 3,3,4,4,5,5,6,6,7,7,8,8,9,9,9-pentadecafluorononyl ester, 2-methyl-3,3,4,4,5,5,6,6,7,7,8,8,9,9,9-pentadecafluorononyl ester, 3,3,4,4,5,5,6,6,7,7,8,8,8-tridecafluorooctyl ester, 2-methyl-3,3,4,4,5,5,6,6,7,7,8,8,8-tridecafluorooctyl ester, 3,3,4,4,5,5,6,6,7,7,7-undecafluoroheptyl ester, 2-methyl-3,3,4,4,5,5,6,6,7,7,7-undecafluoroheptyl ester, 3,3,4,4,5,5,6,6,6-nonafluorohexyl ester, 2-methyl-3,3,4,4,5,5,6,6,6-nonafluorohexyl ester, 3,3,4,4,5,5,6,6,7,7,8,8,9,9,10,10,11,11,11-nonadecafluoroundecyl ester, 2-methyl-3,3,4,4,5,5,6,6,7,7,8,8,9,9,10,10,11,11,11-nonadecafluoroundecyl ester, 3,3,4,4,5,5,6,6,7,7,8,8,9,9,10,10,11,11,12,12,12-heneicosafluorododecyl ester, 2-methyl-3,3,4,4,5,5,6,6,7,7,8,8,9,9,10,10,11,11,12,12,12-heneicosafluorododecyl ester, 3,3,4,4,5,5,6,6,7,7,8,8,9,9,10,10,11,11,12,12,13,13,13-tricosafluorotridecyl ester, 2-methyl-3,3,4,4,5,5,6,6,7,7,8,8,9,9,10,10,11,11,12,12,13,13,13-tricosafluorotridecyl ester, 3,3,4,4,5,5,6,6,7,7,8,8,9,9,10,10,11,11,12,12,13,13,14,14,14-pentacosafluorotetradecyl ester, and 2-methyl-3,3,4,4,5,5,6,6,7,7,8,8,9,9,10,10,11,11,12,12,13,13,14,14,14-pentacosafluorotetradecyl ester.

6. The method of claim 1, wherein the hydrolysis of step (b) is performed by using an aqueous solution of a strong base selected from the group consisting of KOH and tetramethylammonium hydroxide (TMAH).

7. The method of claim 1, further comprising, before the step (a), depositing a crosslinking agent on both surfaces of the substrate.

8. The method of claim 7, wherein the crosslinking agent comprises at least two vinyl groups per a molecule including 2,4,6,8-Tetramethyl-2,4,6,8-tetravinylcyclotetrasiloxane, 1,3,5-trimethyl-1,3,5-trivinyl-cyclotrisiloxane, divinylbenzene, diethyleneglycoldivinylether, diethyleneglycoldiacrylate, ethyleneglycoldimethacrylate, and 1,3-diethenyl-1,1,3,3-tetramethyl-disiloxane.

9. A method of preparing a functional fiber having a superhydrophobic region and a hydrophilic region, comprising:
(a) depositing a superhydrophobic polymer on a rolling film by using a superhydrophobic monomer and an initiator using initiated chemical vapor deposition, while unwinding a fabric from a rolling film which the fabric is wound; and
(b) hydrolyzing by wet-etching one surface of superhydrophobic fabric in a reactor containing basic solution, thereby modifying said surface of superhydrophobic fabric into a hydrophilic surface by converting ester group of the superhydrophobic fabric into carboxyl group and removing fluorine group.

10. A method of preparing a surface body having a superhydrophobic region and a hydrophilic region, comprising:
(a) depositing a superhydrophobic polymer on a porous substrate to render the substrate superhydrophobic;
(b) forming a superhydrophobic protecting layer on one surface of the superhydrophobic porous substrate;
(c) treating other surface of the porous substrate with plasma, thereby rendering other surface of the porous substrate hydrophilic; and
(d) removing a superhydrophobic protecting layer, thereby rendering the one surface of the porous substrate superhydrophobic.

* * * * *